Jan. 19, 1960 M. H. MORRIS 2,922,021
MACHINING METHOD AND APPARATUS
Filed July 2, 1956
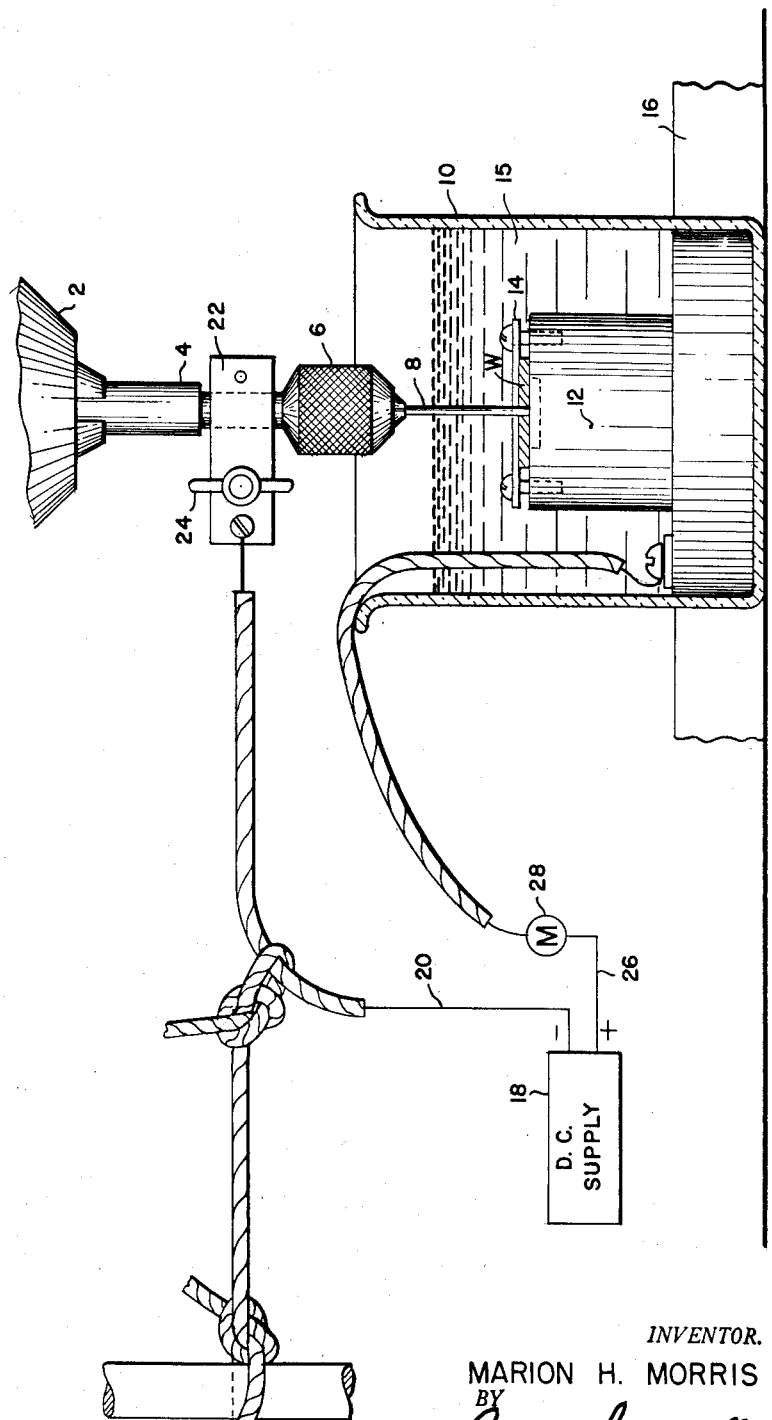
INVENTOR.
MARION H. MORRIS
BY
ATTORNEYS

United States Patent Office 2,922,021
Patented Jan. 19, 1960

2,922,021

MACHINING METHOD AND APPARATUS

Marion H. Morris, Mountain View, Calif., assignor to Sperry-Sun Well Surveying Company, Philadelphia, Pa., a corporation of Delaware Application July 2, 1956, Serial No. 595,230

9 Claims. (Cl. 219—69)

This invention relates to a machining method and apparatus and has particular reference to the drilling or other machining of extremely hard materials which are not susceptible to ordinary machining.

So-called arc or spark drilling is carried out for the drilling of materials which are ordinarily not drillable by conventional drills. For example, such drilling has been used for drilling materials such as tungsten carbide, Alnico, hardened steel, or other extremely hard alloys. Heretofore, the drilling has involved the use of expensive apparatus and elaborate methods involving liquid feeding, etc., which has made such drilling inapplicable where the cost of equipment was prohibitive.

It is the general object of the present invention to provide a machining method and apparatus which is extremely simple and avoids the expense and other drawbacks of the arc or spark method heretofore used. As will be presently indicated, a conventional drill press may be readily used as the mechanism for carrying out the invention for drilling. Difficulties involving cooling, liquid feed, or the like are also completely eliminated, and an electrical supply may be used without any unusual power requirements.

The foregoing and other objects of the invention, particularly relating to details of operation, will become apparent from the following description read in conjunction with the accompanying drawing in which the figure is a sectional and partially diagrammatic view showing a very simple form of apparatus for use in carrying out the invention, specifically for drilling.

The invention will be described as applied to the drilling of small elements of extremely hard material. There is indicated at 2 the chuck of an ordinary drill press in which there is held a spindle 4 which carries a small chuck 6, the spindle and small chuck essentially being in the form of a conventional pin vise. In the chuck 6 there is secured a drilling rod 8 which preferably is in the form of a rod of tungsten or other refractory metal. While other rods may be used, tungsten is preferred since, through its use there is very little wear on the rod. The rod 8 is cylindrical in cross-section and need not be provided with a lower end of any particular shape.

As shown in the drawing, a vessel 10 is provided which may be of glass or metal (provided that in the latter case it is insulated from the drill press table), there being located within the vessel 10 a suitable support 12 of metal for the work W, the work being held on the support by clamping means indicated at 14. As will be evident, the support and clamping means may be of any suitable type for the effective holding of the work W. The vessel is held in position on the table by means of a retaining means such as 16. Immersing the work there is carbon tetrachloride indicated at 15 contained in the vessel 10.

A direct current power supply indicated at 18, typically supplying 20 volts at 2 amperes, though this is not critical, and which may be of any suitable form, such as a storage battery or a rectifier power supply, has its positive terminal connected through wire 26 to the support 12, there being interposed, desirably, an ammeter 28. The negative terminal of the supply is connected through conductor 20 to a brush arrangement indicated at 22 provided to conduct the current to the spindle 4 and drilling rod 8. This may take any suitable form as, for example, a clamp adjustable by a thumb screw 24 so that the spindle 4 has a running fit therein, the cable being restrained from rotating by suitable anchorage to the drill press. The current may be conducted to the drilling rod 8 in any other suitable fashion, even through the drill press bearings, though desirably this is avoided in view of the fact that moderately heavy currents are utilized.

In operation it is only necessary to cause the spindle 4 to rotate while hand pressure is applied to an extent necessary to maintain the current through the ammeter 28 at a value suitable for the operation. This value of current depends upon the size of the hole being drilled, and as a typical example, if the complete short circuit current is ten amperes the pressure applied may be such that the meter 28 will read two amperes during operation. The result, then, is rotation of the rod 8 in contact with the work with the production of sparking at the area of contact.

While I cannot state with certainty the principle involved in the operation, the results obtained would seem to indicate that the sparking between the rod 8 and the work dissociates the carbon tetrachloride to give rise to free carbon and nascent chlorine which latter attacks the material of the work which constitutes the anode of the system. Free carbon quickly clouds the carbon tetrachloride, in which, apparently, there is also suspended the chloride or chlorides of the metal or metals involved in the work. Polarization as indicated is important, and with the rod 8 the cathode and the work the anode there is very little metal removed from the rod 8 during the drilling of a hole.

In contrast with the operation involved in the conventional arc or spark drilling, where oxidation apparently occurs, there is relatively little heat evolved with the result that there is little or no boiling of the carbon tetrachloride, whereas in the usual arc or spark process the aqueous liquid generally used is thrown about with considerable boiling.

Not only can there be formed holes of large diameter, but very small holes may be readily drilled, the holes being only slightly larger than the diameter of the tungsten rod 8 which is used. Alnico 5 is a typical material which may be readily drilled by this process, this magnet alloy being normally completely unmachinable by conventional methods. Tungsten carbide cutters may be also readily drilled. The invention is applicable also to the drilling of other alloys which are unmachinable or machinable only with great difficulty or through the use of diamond bits or the like.

While the invention has been particularly described in its application to drilling, it will be evident that it may be applied to various other forms of machining such as slitting, milling, or the like, there being then used as the tool in contact with the work a disc, cylinder, or other tool having the form of a suitable surface or revolution mounted for progress relative to the work as machining progresses.

Since the invention is of quite general applicability, it is not to be considered as limited in scope except as required by the following claims.

What is claimed is:

1. The method of drilling comprising rotating in contact with electrically conductive work a drilling rod while the zone of drilling is immersed in carbon tetrachloride and while a current is fed between the work and drilling rod, the work being positive with respect to the rod.

2. The method according to claim 1 in which the rod is tungsten.

3. The machining method comprising rotating in contact with electrically conductive work a tool while the zone of machining is immersed in carbon tetrachloride and while a current is fed between the work and the tool, the work being positive with respect to the tool.

4. The method according to claim 3 in which at least the portion of the tool in engagement with the work is tungsten.

5. Apparatus for drilling comprising a drilling-rod, means for rotating the rod about its axis, a container of carbon tetrachloride, means holding work immersed in the carbon tetrachloride at the point being drilled, and current supplying means having its positive terminal connected to the work and its negative terminal connected to said drilling rod.

6. Apparatus according to claim 5 in which the drilling rod is tungsten.

7. The method according to claim 1 in which the current fed between the work and the drilling rod is substantially unidirectional.

8. The method according to claim 3 in which the current fed between the work and the tool is substantially unidirectional.

9. Apparatus according to claim 5 in which the current supplying means supplies a substantially unidirectional current.

References Cited in the file of this patent

UNITED STATES PATENTS

| | | |
|---|---|---|
| 1,827,210 | Siebs | Oct. 13, 1931 |
| 2,552,582 | Peters et al. | May 15, 1951 |
| 2,576,793 | Jordan | Nov. 27, 1951 |
| 2,730,602 | Porterfield | Jan. 10, 1956 |
| 2,756,316 | Teubner | July 24, 1956 |